(12) United States Patent
Saito

(10) Patent No.: US 10,536,025 B2
(45) Date of Patent: Jan. 14, 2020

(54) RELAY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Takahiro Saito, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/062,657

(22) PCT Filed: Jun. 12, 2017

(86) PCT No.: PCT/JP2017/021605
§ 371 (c)(1),
(2) Date: Jun. 15, 2018

(87) PCT Pub. No.: WO2017/217360
PCT Pub. Date: Dec. 21, 2017

(65) Prior Publication Data
US 2019/0097453 A1    Mar. 28, 2019

(30) Foreign Application Priority Data
Jun. 17, 2016 (JP) .................................. 2016-120537

(51) Int. Cl.
*H02J 7/00* (2006.01)
*H02J 7/14* (2006.01)
(Continued)

(52) U.S. Cl.
CPC ............ *H02J 7/1423* (2013.01); *B60R 16/02* (2013.01); *H02J 7/0021* (2013.01); *H02J 7/0031* (2013.01); *H01H 47/005* (2013.01)

(58) Field of Classification Search
CPC ... Y02T 10/7005; Y02T 90/14; Y02T 10/705; Y02T 10/7088; Y02E 60/12
See application file for complete search history.

(56) References Cited

U.S. PATENT DOCUMENTS

2009/0212627 A1* 8/2009 Sakata ................... H02H 9/001
307/10.7
2011/0140518 A1* 6/2011 Hattori .................. H02J 7/1423
307/9.1
(Continued)

FOREIGN PATENT DOCUMENTS

| JP | 2001-037070 A | 2/2001 |
| JP | 2007-022195 A | 2/2007 |
| JP | 2014-034376 A | 2/2014 |

OTHER PUBLICATIONS

Search Report for PCT/JP2017/021605, dated Aug. 29, 2017.

*Primary Examiner* — Arun C Williams
(74) *Attorney, Agent, or Firm* — Honigman LLP

(57) ABSTRACT

The present invention realizes a relay device that can prevent malfunction due to occurrence of reverse flow of current in any of paths. A control unit that is provided in a relay device functions as a switching control unit, keeps an ON state of a first relay unit and a second relay unit if both of currents flowing through a first conduction path and a second conduction path flow in a normal direction (direction toward a load, and if the current flows in the reverse direction in one of the paths, switches one relay unit that is provided in a reverse flow path in which the current flows in a reverse direction to an OFF state.

5 Claims, 14 Drawing Sheets

(51) Int. Cl.
*B60R 16/02* (2006.01)
*H01H 47/00* (2006.01)

(56) References Cited

U.S. PATENT DOCUMENTS

| | | | | |
|---|---|---|---|---|
| 2014/0210419 A1* | 7/2014 | Kim | ...................... | H02J 7/0063 |
| | | | | 320/134 |
| 2014/0232353 A1* | 8/2014 | Stickel | .................. | H02J 7/0031 |
| | | | | 320/137 |
| 2015/0355258 A1* | 12/2015 | Guo | ..................... | G01R 31/025 |
| | | | | 324/509 |
| 2016/0119976 A1* | 4/2016 | Bach | ...................... | G01R 19/10 |
| | | | | 324/713 |

* cited by examiner

RELAY DEVICE

CROSS-REFERENCE TO RELATED APPLICATIONS

This application is the U.S. national stage of PCT/JP2017/021605 filed Jun. 12, 2017, which claims priority of Japanese Patent Application No. 2016-120537 filed on Jun. 17, 2016, which is incorporated herein by reference in its entirety.

FIELD OF THE INVENTION

The present description relates to an in-vehicle relay device.

BACKGROUND OF THE INVENTION

JP 2014-34376A discloses a vehicle power supply system in which two storage batteries are connected via a connection switch. In this vehicle power supply system, while regenerative power generation is performed, a regulated voltage of an alternator is controlled to be higher than its output voltage generated while the regenerative power generation is not performed. In addition, while regenerative power generation is performed, a target voltage of a lead storage battery is set, and then control is performed so that a deviation between a detected value and the target voltage is lower than or equal to a predetermined amount and the regulated voltage is not higher than the target voltage by a predetermined voltage width or more.

SUMMARY OF THE INVENTION

The vehicle power supply system disclosed in JP 2014-34376A employs the above-described control, thus suppressing instability of electric load operation caused when the connection switch, which is provided between the first storage battery and the second storage battery, is cut off. However, in this system, a configuration in which a path from the storage battery is protected with a fuse is not disclosed, and thus a solution for a cut off of the fuse due to a reverse flow of current cannot be obtained in this system.

In contrast, FIG. 13 shows an example of a system that enables power supply from two power storage units to a load and has a fuse portion for protecting the paths from the power storage units. The in-vehicle power supply system shown in FIG. 13 has a configuration in which power from a main battery 181 is supplied to a load 191 via a conduction path 151 and power from a sub battery 182 is also supplied to a load 191 via a conduction path 152. If relay units 141 and 142 are switched to an ON state around the same time, for example, power supply to the load 191 via two paths can be performed. Thus, if one of the batteries is lost, protection in the form of turning off the relay unit in the one path of the lost battery can be performed, and power supply to the load 91 can be maintained through the other path. Also, fuse portions 171 and 172 are respectively provided in the conduction paths 151 and 152, if an overcurrent exceeding estimation occurs in either of the paths, circuits and devices can be protected from the overcurrent by fusing the fuse portion 171. Furthermore, the system shown in FIG. 13 has a configuration in which the main battery 181 and the sub battery 182 can be conductively connected via a conduction path 183, when a relay unit 143 is in an ON state, a generator 184 connected to the main battery 181 can supply a charging current to both of the batteries 181 and 182. If the relay unit 143 is in the ON state while regenerative power generation is performed by the generator 184, for example, both of the batteries 181 and 182 can be charged using regenerative power from the generator 184.

However, in the system shown in FIG. 13, if the relay unit 143 is in an OFF state when the generator 184 is generating power, there is a risk that a current supplied from the generator 184 does not flow through the conduction path 183, but flows through the conduction paths 151 and 152 instead, and thus flows into the sub battery 182. Such a sneak current may cause unexpected malfunctions if proper countermeasures are not taken. When the fuse portion 172 on the sub battery 182 side, for example, has been designed in consideration of the consumption current amount of the load 191, if the amount of the above-described sneak current is much larger than the anticipated consumption current amount of the load 191, there is a risk that unintended fusing at the fuse portion 172 may occur.

The present description has been made in view of the above-described situation, and aims to realize a relay device that can supply power to a load from at least two power storage units and can be applied to a system in which each path of the power storage units can be protected with a fuse portion, and also can prevent malfunctions due to reverse flow of current occurred in either of the paths.

A relay device that is an example of the present description is a relay device used in an in-vehicle power supply system that includes a first conduction path that is electrically connected to a first power storage unit and is a path for supplying power to a load via a first fuse portion, a second conduction path that is electrically connected to a second power storage unit and is a path for supplying power to the load via a second fuse portion, and a third conduction path whose one side is connected to the first conduction path on a first power storage unit side relative to the first fuse portion and the other side is connected to the second conduction path on a second power storage unit side relative to the second fuse portion, the relay unit includes: a first relay unit configured to be switched between ON and OFF states at a position on a load side relative to the first fuse portion in the first conduction path; a second relay unit configured to be switched between ON and OFF states at a portion on the load side relative to the second fuse portion in the second conduction path; a first current detection unit configured to detect, at least, a direction of current flowing through the first conduction path; a second current detection unit configured to detect, at least, a direction of current flowing through the second conduction path; and a switching control unit configured to maintain the ON state of the first relay unit and the second relay unit if current flows in a normal direction, which is a direction toward the load, in each of the first conduction path and the second conduction path, and configured to switch, if current flows in a reverse direction to the normal direction in one of the first conduction path and the second conduction path, that one of the first relay unit and the second relay unit that is provided in a reverse flow path in which current flows in the reverse direction, to the OFF state.

In the above-described relay device, if current flows in the normal direction, which is a direction toward the load, in each of the first conduction path and the second conduction path, the switching control unit keeps the ON state of the first relay unit and the second relay unit. With this configuration, if current flows through each of the first conduction path and the second conduction path in the normal direction, it is possible to supply current through two paths. In addition to enabling current supply through the two paths, if current flows in the reverse direction in one of the paths, it is also possible to switch one of the first relay unit and the second relay unit, which is provided in the reverse flow path, to the OFF state. In this manner, because one of the relay units provided in a path in which reverse flow of current occurs can be switched to the OFF state, it is possible to prevent reverse flow from continuing in that path. Therefore, malfunction due to occurrence of the reverse flow, such as a break of the fuse portion in the reverse flow path caused by continuous increase of reverse current, can be prevented.

DETAILED DESCRIPTION OF THE PREFERRED EMBODIMENTS

Figure 1:
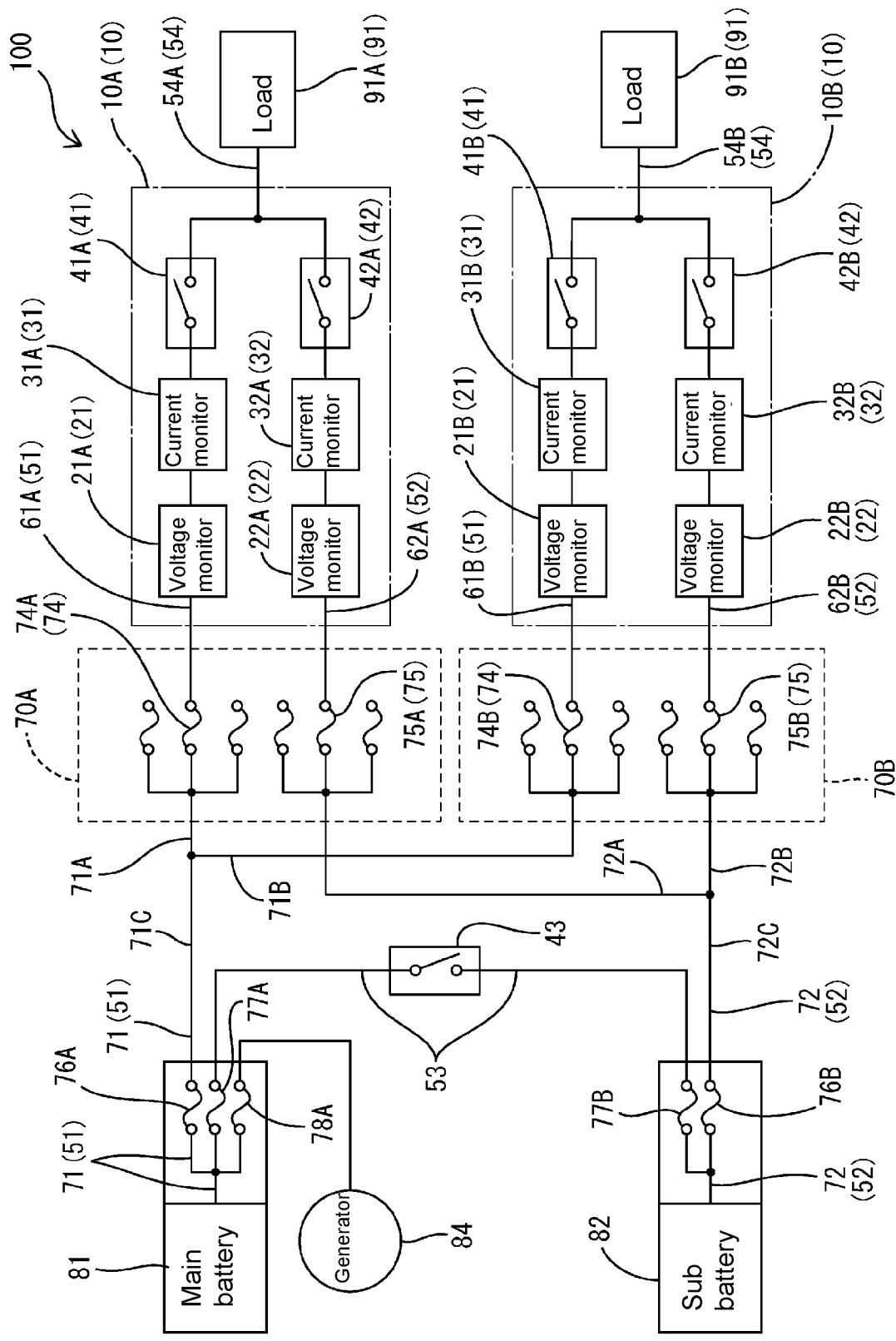
FIG. 1 is a block diagram schematically illustrating an example of an in-vehicle power supply system including a relay device according to Embodiment 1.

The following shows preferred examples of the present description. Note that the present description is not limited to following configurations.

If a current flows in the reverse direction in one of the first conduction path and the second conduction path, the switching control unit may be configured to function to switch one of the first relay unit and the second relay unit to the OFF state after confirming that the other relay unit is in the ON state.

If a current flows in the reverse direction in one of the paths, the relay device configured in this manner can switch the relay unit provided in the one path through which the current flows in the reverse direction (one relay unit) to the OFF state after securely switching the other relay unit to the ON state. Accordingly, it power supply to the load is reliably prevented from being lost before and after the one relay unit is switched to the OFF state.

The relay device may include a confirmation unit that is configured to confirm whether the third relay unit, which switches the third conduction path between conductive and non-conductive states if reverse flow of current occurs in one of the first conduction path and the second conduction path, can be controlled to be in the ON state.

The relay device configured in this manner can confirm whether the third relay unit can be controlled to be in the ON state if reverse flow occurs in one of the paths, and can clarify a cause of the reverse flow more clearly by ascertaining whether the third relay unit, which may be a cause of the reverse flow, can be normally controlled.

The relay device may include a notification unit that is configured to give a notification if the confirmation unit has confirmed that the third relay unit cannot be controlled to be in the ON state.

The relay device configured in this manner can confirm, if reverse flow occurs, whether the third relay unit, which may be a cause of the reverse flow, can be normally controlled, and if confirming that the third relay unit cannot be controlled to be in the ON state (that is, if possibility that the third relay unit is the cause of the reverse flow increases), the relay device can notify outside about this.

The relay device may include a third power storage unit that is electrically connected to at least one of a portion on the load side relative to the first relay unit in a path between the first power storage unit and the load and a portion on the load side relative to the second relay unit in a path between the second power storage unit and the load, and that is charged by at least one of the first power storage unit and the second power storage unit and kept in a state of being conductively connected with the load when the first relay unit and the second relay unit are in the OFF state.

The relay device configured in this manner can supply power to the load using the third power storage unit even if both of the relay units enter the OFF state for some reason, and thus power supply to the load is less likely to be cut off. If one of the relay units is switched to the OFF state due to occurrence of the reverse flow, for example, power supply to the load is easily kept by power from the third power storage unit even if the other relay unit is in the OFF state for some reason.

Embodiment 1

The following will describe Embodiment 1 in which the present description is embodied.

An in-vehicle power supply system 100 (hereinafter, also referred to as "system 100") is configured as a power supply system for a vehicle that includes a plurality of batteries (a first power storage unit 81 and a second power storage unit 82). A relay device 10 constitutes a portion of the in-vehicle power supply system 100. Note that the in-vehicle power supply system 100 in FIG. 1 includes two relay devices 10 (a first relay device 10A and a second relay device 10B) that have the same function.

The first power storage unit 81 functions as a main power supply, and consists of, for example, a well-known battery such as a lead battery. In the following description and the drawings, the first power storage unit 81 is also referred to as "main battery". A terminal on a high-potential side of the first power storage unit 81 is electrically connected to a wiring portion 71 provided outside of the relay device 10, and the first power storage unit 81 has a configuration in which it applies DC voltage to the wiring portion 71. A terminal on a low-potential side of the first power storage unit 81 is, for example, electrically connected to ground. Note that the wiring portion 71 constitutes a portion of a first conduction path 51.

The generator 84 is electrically connected to the wiring portion 71 that is conductively connected with the first power storage unit 81, and has a configuration in which it applies generated voltage to the wiring portion 71. The generator 84 is configured as a well-known alternator, and its operation is controlled by an electronic control device (not shown). This generator 84 has a function to charge the first power storage unit 81, and has a function to charge the second power storage unit 82 as well when a third relay unit 43 (separation relay) is switched ON.

The second power storage unit 82 functions as an auxiliary power supply and consists of, for example, a well-known power supply such as a lithium ion battery or an electric double-layer capacitor. In the following description and the drawings, the second power storage unit 82 is also referred to as "sub battery". The second power storage unit 82 can receive more energy than the first power storage unit 81, its terminal on a high-potential side is electrically connected to a wiring portion 72 provided outside of the relay device 10, and has a configuration in which it applies DC voltage to the wiring portion 72. A low-potential side terminal of the second power storage unit 82 is, for example, electrically connected to ground. Note that this system has a configuration in which regenerative energy generated by the generator 84 is supplied not only to the first power storage unit 81 but also to the second power storage unit 82 in order to charge them. Also, the wiring portion 72 constitutes a portion of a second conduction path 52.

A third conduction path 53 is a conduction path that can provide a conductive connection between the wiring portion 71 (a portion of the first conduction path 51) electrically connected to the first power storage unit 81 and the wiring portion 72 (a portion of the second conduction path 52) electrically connected to the second power storage unit 82. One side of the third conduction path 53 is electrically connected to the wiring portion 71 and the terminal on the high-potential side of the first power storage unit 81 (main battery) via a fuse portion 77A, and the other side is electrically connected to the wiring portion 72 and the terminal on the high-potential side of the second power storage unit 82 (sub battery) via a fuse portion 77B. One end of the third conduction path 53 is connected to the wiring portion 71 on the first power storage unit 81 side relative to a fuse portion 74 (first fuse portion), specifically, on the first power storage unit 81 side relative to a fuse portion 76A. The other end of the third conduction path 53 is connected to the wiring portion 72 on the second power storage unit 82 side relative to a fuse portion 75 (second fuse portion), specifically, on the second power storage unit 82 side relative to a fuse portion 76B.

The third relay unit 43 (separation relay) is a relay unit that switches the third conduction path 53 between the conductive and non-conductive states. When the third relay unit 43 is in the ON state, the third conduction path 53 is in the conductive state, and the path between the wiring portion 71 and the wiring portion 72 is in conductively connected state. When the third relay unit 43 is in the OFF state, the third conduction path 53 is in the non-conductive state, and electric conduction is cut off in both directions in the third conduction path 53.

The first conduction path 51 is a path for supplying power from the first power storage unit 81 to a load 91 via the fuse portion 74 (first fuse portion), and includes the wiring portion 71 arranged outside of the relay device 10 and a conduction path 61 arranged inside of the relay device 10. The first conduction path 51 is connected to the one side of the third conduction path 53 on the first power storage unit 81 side relative to the fuse portion 74 (first fuse portion).

The second conduction path 52 is a path for supplying power from the second power storage unit 82 to the load 91 via the fuse portion 75 (second fuse portion), and includes the wiring portion 72 arranged outside of the relay device 10 and a conduction path 62 arranged inside of the relay device 10. The second conduction path 52 is connected to the other side of the third conduction path 53 on the second power storage unit 82 side relative to the fuse portion 75 (second fuse portion).

The wiring portion 71 includes a shared power path 71C that is electrically connected to the first power storage unit 81, and includes two power paths 71A and 71B that are branched from this power path 71C. The power path 71A is a path used for supplying power from the first power storage unit 81 to a load 91A, and electrically connected to a conduction path 61A of one relay device 10A via a fuse portion 74A. The power path 71B is a path used for supplying power from the first power storage unit 81 to a load 91B, and electrically connected to a conduction path 61B of the other relay device 10B via a fuse portion 74B.

The wiring portion 72 includes a shared power path 72C that is electrically connected to the second power storage unit 82, and includes two power paths 72A and 72B that are branched from this power path 72C. The power path 72A is a path used for supplying power from the second power storage unit 82 to the load 91A, and electrically connected to a conduction path 62A of the one relay device 10A via a fuse portion 75A. The power path 72B is a path used for supplying power from the second power storage unit 82 to the load 91B, and electrically connected to a conduction path 62B of the other relay device 10B via a fuse portion 75B. Fuses provided in the power paths 71A and 72A (such as the fuse portions 74A and 75A) are housed in a first fuse box 70A, and fuses provided in the power paths 71B and 72B (such as the fuse portions 74B and 75B) are housed in a second fuse box 70B.

The fuse portion 74 is an example of the first fuse portion and provided in the first conduction path 51 that is the path between the first power storage unit 81 and the load 91. In the example of FIG. 1, the fuse portion 74A is provided in the power path 71A that is the path between the first power storage unit 81 and the load 91A, and the fuse portion 74B is provided in the power path 71B that is the path between the first power storage unit 81 and the load 91B.

The fuse portion 75 is an example of the second fuse portion and provided in the second conduction path 52 that is the path between the second power storage unit 82 and the load 91. In the example of FIG. 1, the fuse portion 75A is provided in the power path 72A that is the path between the second power storage unit 82 and the load 91A, and the fuse portion 75B is provided in the power path 72B that is the path between the second power storage unit 82 and the load 91B.

The load 91 is a well-known in-vehicle electric component and may be any of various loads. The load 91 may be an ignition-related load such as a steering actuator, a shift-by-wire mechanism, or an electronic control brake system (a load that operates when an ignition switch is in an ON state), or may be an accessory-related load such as a navigation system device, an audio device, or an air conditioner (a load that operates when an accessory switch is in an ON state). In the example of FIG. 1, the load 91A is electrically connected to the relay device 10A, and is a load whose power-supplied state is switched by the relay device 10A. The load 91B is electrically connected to the relay device 10B, and is a load whose power-supplied state is switched by the relay device 10B. It is desirable to select a load whose continuous operation is strongly desired as these loads 91A and 91B. The in-vehicle power supply system 100 shown in FIG. 1 has a configuration in which, even when power supply from one power storage unit to the loads 91A and 91B is lost, power supply from the other power storage unit to the loads can be maintained, and has a configuration in which stable operation of the load is easily continued.

Figure 2:
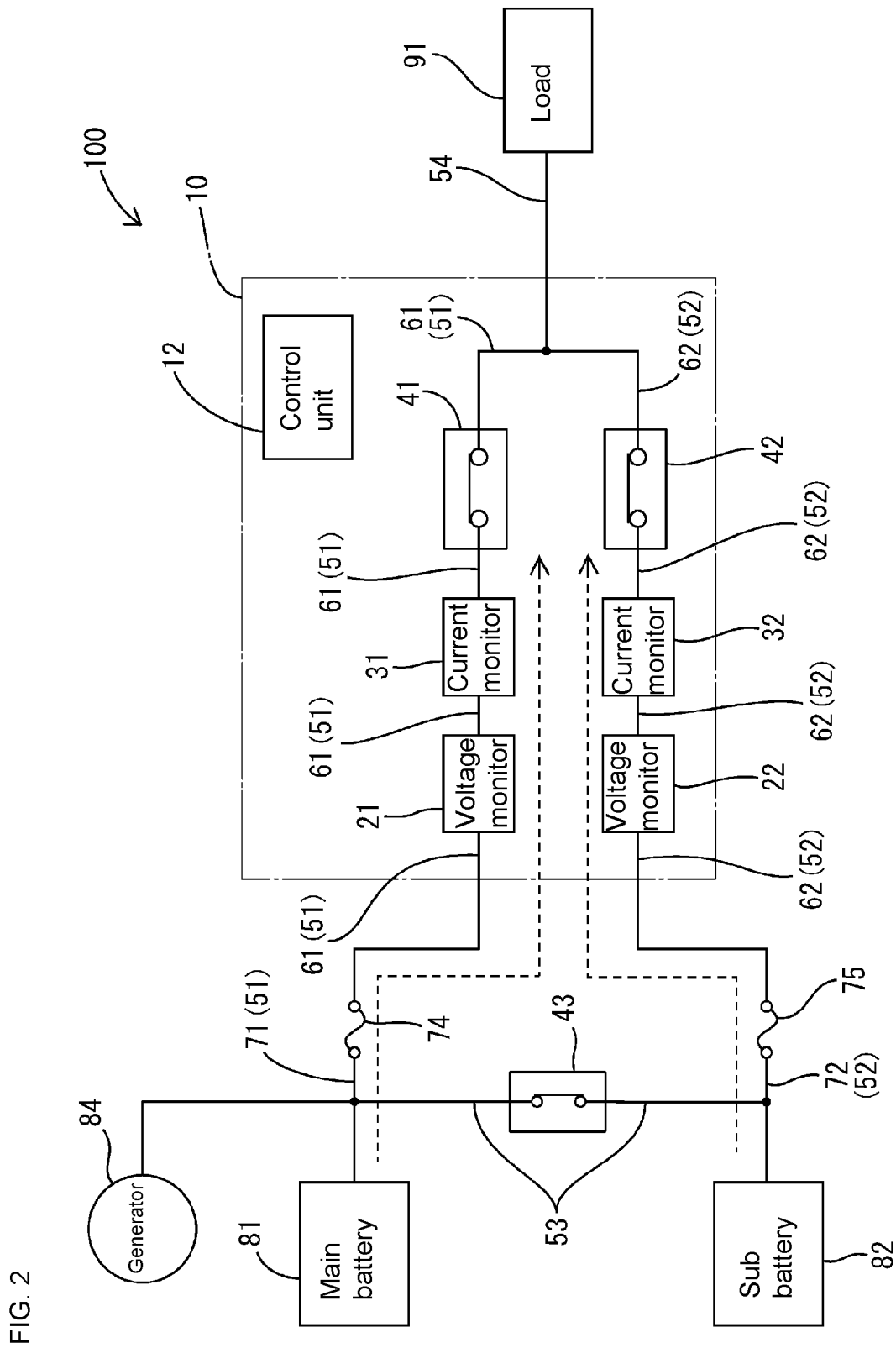
FIG. 2 is a block diagram schematically illustrating an example of the relay device and its surroundings according to Embodiment 1.

Next, the relay device 10 will be described. As shown in FIGS. 1 and 2, the relay device 10 includes a first relay unit 41, a second relay unit 42, a first voltage detection unit 21, a second voltage detection unit 22, a first current detection unit 31, a second current detection unit 32, and a control unit 12, for example. Two relay devices 10A and 10B are mounted in the in-vehicle power supply system 100 shown in FIG. 1. These relay devices have the same configuration, and each of them is configured as shown in FIG. 2. Note that, in FIG. 1, the elements of the relay device 10A are represented as a first relay unit 41A, a second relay unit 42A, a first voltage detection unit 21A, a second voltage detection unit 22A, a first current detection unit 31A, and a second current detection unit 32A. A portion of the first conduction path 51, a portion of the second conduction path 52, and a conduction path 54 that connects these conduction paths to the load are separately represented as the conduction path 61A, the conduction path 62A, and a conduction path 54A respectively. Also, the elements of the relay device 10B are represented as a first relay unit 41B, a second relay unit 42B, a first voltage detection unit 21B, a second voltage detection unit 22B, a first current detection unit 31B, and a second current detection unit 32B. A portion of the first conduction path 51, a portion of the second conduction path 52, and a conduction path 54 that connects these conduction paths to the load are separately represented as the conduction path 61B, the conduction path 62B, and a conduction path 54B respectively.

As a representative example, in the following description, it is assumed that the relay device 10A shown in FIG. 1 has a configuration as shown in FIG. 2. As shown in FIG. 2, the relay device 10 includes the first relay unit 41, the second relay unit 42, the first voltage detection unit 21, the second voltage detection unit 22, the first current detection unit 31, the second current detection unit 32, and the control unit 12, for example. In the example shown in FIG. 2, the first relay unit 41, the second relay unit 42, the first voltage detection unit 21, the second voltage detection unit 22, the first current detection unit 31, the second current detection unit 32, and the control unit 12 are mounted on the same board, and the entire relay device 10 is configured as a unit device in which these elements are integrated into a unit. Note that, in FIG. 2, the generator 84 (shown in FIG. 1) and so on are omitted and the configuration is only schematically illustrated.

The first relay unit 41 shown in FIG. 2 is provided in the first conduction path 51 (specifically, in the conduction path 61) that is a path for supplying power from the first power storage unit 81 to the load 91, and has a configuration in which it is switched between the ON and OFF states on the load 91 side relative to the fuse portion 74 (first fuse portion). The first relay unit 41 is provided on a downstream side (load 91 side) of the first voltage detection unit 21 and the first current detection unit 31 in the first conduction path 51, and configured as a relay that switches the first conduction path 51 between the conductive and non-conductive states. If the first relay unit 41 is in the ON state, the path between the first power storage unit 81 and the load 91 is conductively connected via the first conduction path 51, then, at this time, it is possible to supply power from the first power storage unit 81 to the load 91 via the first conduction path 51. If the first relay unit 41 is in the OFF state, no current flows through the first conduction path 51 in either direction, at this time, it is impossible to supply power from the first power storage unit 81 to the load 91 via the first conduction path 51.

The second relay unit 42 is provided in the second conduction path 52 (specifically, in the conduction path 62) that is a path for supplying power from the second power storage unit 82 to the load 91, and has a configuration in which it is switched between the ON and OFF states on the load 91 side relative to the fuse portion 75 (second fuse portion). The second relay unit 42 is provided on a downstream side (load 91 side) of the second voltage detection unit 22 and the second current detection unit 32 in the second conduction path 52, and configured as a relay that switches the second conduction path 52 between the conductive and non-conductive states. If the second relay unit 42 is in the ON state, the path between the second power storage unit 82 and the load 91 is conductively connected via the second conduction path 52, at this time, it is possible to supply power from the second power storage unit 82 to the load 91 via the second conduction path 52. If the second relay unit 42 is in the OFF state, no current flows through the second conduction path 52 in either direction, at this time, it is impossible to supply power from the second power storage unit 82 to the load 91 via the second conduction path 52.

The first current detection unit 31 shown in FIG. 2 is configured as a well-known current detection circuit that detects a current value of the first conduction path 51. In FIG. 2, the first current detection unit 31 is also referred to as "current monitor". The first current detection unit 31 is provided with a configuration in which it can detect current flowing at a position on an upstream side (first power storage unit 81 side) relative to the first relay unit 41 in the first conduction path 51, and provides a detected value in accordance with a value of current flowing through the first conduction path 51 to the control unit 12 via a signal line (not shown). Furthermore, the first current detection unit 31 detects a direction of the current flowing through the first conduction path 51 (specifically, a direction of the current flowing through the conduction path 61 between the fuse portion 74 and the first relay unit 41), and provides information indicating the direction of the current to the control unit 12. The control unit 12 can specify, according to the detected values that are input from the first current detection unit 31, a value and direction of the current flowing through the first conduction path 51.

The second current detection unit 32 is configured as a well-known current detection circuit that detects a current value of the second conduction path 52. In FIG. 2, the second current detection unit 32 is also referred to as "current monitor". The second current detection unit 32 is provided on an upstream side (second power storage unit 82 side) relative to the second relay unit 42 in the second conduction path 52, and provides a detected value in accordance with a value of current flowing through the second conduction path 52 to the control unit 12 via a signal line (not shown). Furthermore, the second current detection unit 32 detects a direction of the current flowing through the second conduction path 52 (specifically, a direction of the current flowing through the conduction path 62 between the fuse portion 75 and the second relay unit 42), and provides information indicating the direction of the current to the control unit 12. The control unit 12 can specify, according to the detected values that are input from the second current detection unit 32, a current value of the second conduction path 52.

The first voltage detection unit 21 shown in FIG. 2 is configured as a well-known voltage detection circuit. In FIG. 2, the first voltage detection unit 21 is also referred to as "voltage monitor". The first voltage detection unit 21 is provided on an upstream side (first power storage unit 81 side) relative to the first relay unit 41 in the first conduction path 51, and provides a detected value in accordance with a value of voltage at a predetermined position (a position on the first power storage unit 81 side relative to the first relay unit 41) in the first conduction path 51 to the control unit 12 via a signal line (not shown). The control unit 12 can specify, according to the detected value that is input from the first voltage detection unit 21, a voltage value at the predetermined position of the first conduction path 51.

The second voltage detection unit 22 is configured as a well-known voltage detection circuit. In FIG. 2, the second voltage detection unit 22 is also referred to as "voltage monitor". The second voltage detection unit 22 is provided on an upstream side (second power storage unit 82 side) relative to the second relay unit 42 in the second conduction path 52, and provides a detected value in accordance with a value of voltage at a predetermined position (a position on the second power storage unit 82 side relative to the second relay unit 42) in the second conduction path 52 to the control unit 12 via a signal line (not shown). The control unit 12 can specify, according to the detected value that is input from the second voltage detection unit 22, a voltage value at the predetermined position of the second conduction path 52.

The control unit 12 shown in FIG. 2 is, for example, configured as a control unit that includes a CPU. The values detected by the first voltage detection unit 21, the second voltage detection unit 22, the first current detection unit 31, and the second current detection unit 32 are input to the control unit 12, and the control unit 12 controls, based on these detected values, switching of the first relay unit 41, the second relay unit 42, and the third relay unit 43. The control unit 12 switches the third relay unit 43 to the ON state at least while the generator 84 is generating power.

Next, control of the relay device 10 will be described with reference to FIGS. 2, 6 and so on. The control unit 12 executes switching control shown in FIG. 6 when a predetermined start condition is established. The predetermined start condition is not particularly limited, but may be, for example, the start of power supply to the control unit 12.

Figure 6:
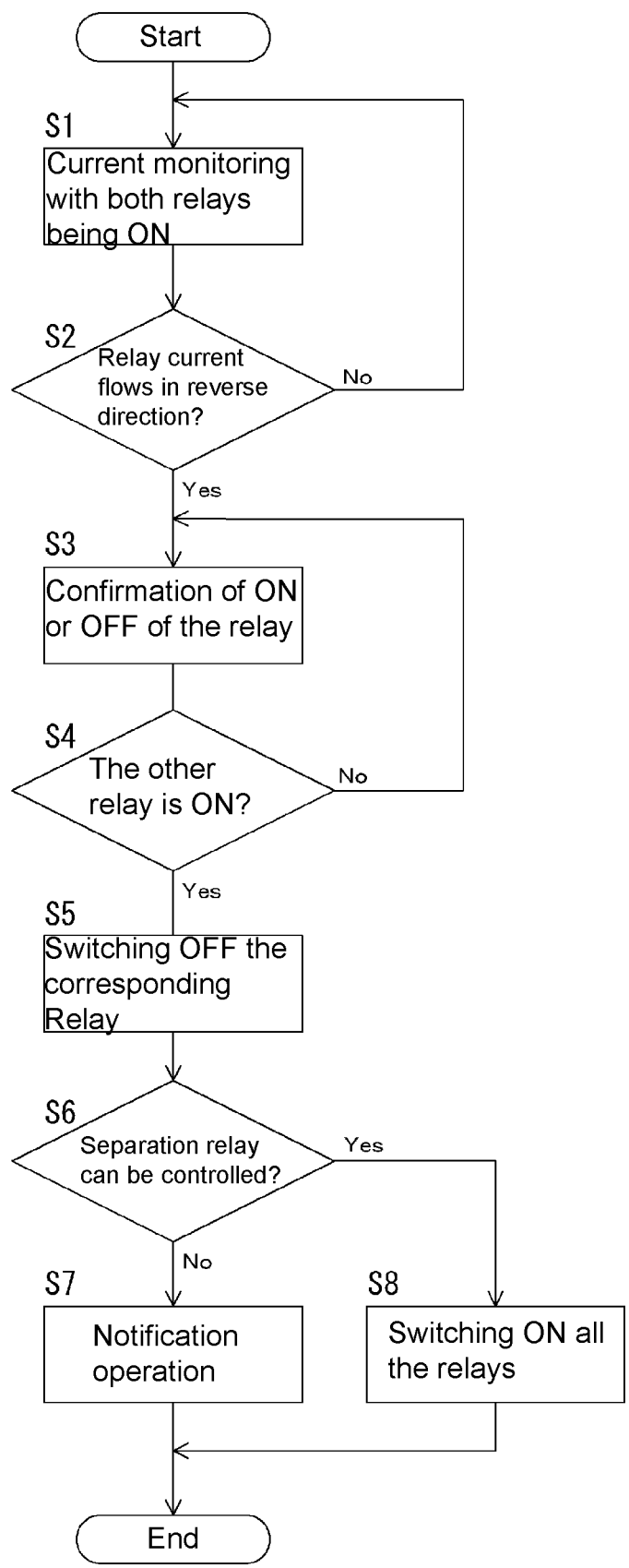
FIG. 6 is a flowchart illustrating an example of a control flow performed by the relay device according to Embodiment 1.

When starting the switching control shown in FIG. 6, the control unit 12 executes the process of step S1, switches both of the first relay unit 41 and the second relay unit 42 shown in FIG. 2 to the ON state, and monitors the detected values that are input from the first current detection unit 31 and the second current detection unit 32. At this time, if the circuit is normal, power can be supplied to the load 91 from both of the first power storage unit 81 and the second power storage unit 82. Note that, in FIG. 2, a state in which currents are supplied from the first power storage unit 81 and the second power storage unit 82 via both of the conduction paths when the circuit is normal is conceptually indicated by broken lines.

In the process of step S1 in FIG. 6, the control unit 12 switches the first relay unit 41 and the second relay unit 42 to the ON state and monitors the detected values that are input from the first current detection unit 31 and the second current detection unit 32, and then executes the process of step S2, determines whether a direction of one of the relay currents flowing through the first relay unit 41 and the second relay unit 42 is the reverse direction when the first relay unit 41 and the second relay unit 42 are in the ON state (that is, whether current flows in the reverse direction in one of the conduction paths 61 and 62).

When executing a determination process of step S2 in FIG. 6, the control unit 12 executes the process of step S1 if determining that the current flowing through each of the conduction paths 61 and 62 does not flow in the reverse direction and each of the relay currents flows in the normal direction (in case of "NO" in S2), and then keeps the first relay unit 41 and the second relay unit 42 in the ON state, and continues monitoring the detected values input from the first current detection unit 31 and the second current detection unit 32. In this manner, in the switching control shown in FIG. 6, each of the first relay unit 41 and the second relay unit 42 is switched to the ON state after the control starts, and then the first relay unit 41 and the second relay unit 42 are kept in the ON state if each of the currents flowing through the first conduction path 51 and the second conduction path 52 flows in the normal direction toward the load 91.

On the other hand, in the determination process of step S2 in FIG. 6, if the control unit 12 determines that one of the relay currents flowing through the first relay unit 41 and the second relay unit 42 flows in the reverse direction (that is, if one of currents flowing through the conduction path 61 and the conduction path 62 flows in the reverse direction and the determination result is "Yes" in S2), the control unit 12 executes the process of step S3, and confirms the ON or OFF state of the other relay unit that is different from the relay unit (the relay unit to be OFF) in the path in which a current flows in the reverse direction. If it is determined that, for example, the current flowing through the first conduction path 51 flows in the reverse direction in step S2, in the following step S3, the control unit 12 confirms whether the second relay unit 42, which is provided in the other path (the second conduction path 52) that is different from the path (the first conduction path 51) that is determined that the current flows in the reverse direction, is controlled to be in the ON state. Note, that there are various conceivable causes that make the current flow in the reverse direction, for example, a case where the third relay unit 43 was switched to the OFF state for some reason while the generator 84 is generating power and the voltage on the second power storage unit 82 side becomes lower than that on the conduction path 54 side is conceivable as one of the causes.

In the process of step S4 after executing the process of step S3 in FIG. 6, the control unit 12 determines whether the relay unit, which is provided in the other path that is different from the path that is determined that a current flows in the reverse direction, is in the ON state, and then, if the relay is not in the ON state, the control unit 12 executes the process of step S3 again for reconfirming the ON or OFF state of the relay. In this manner, in the switching control in FIG. 6, if it is determined that the current flowing through one of the paths flows in the reverse direction, the confirmation process of step S3 and the determination process of step S4 are repeated until the relay unit provided in the other path is switched to the ON state.

Figure 3:
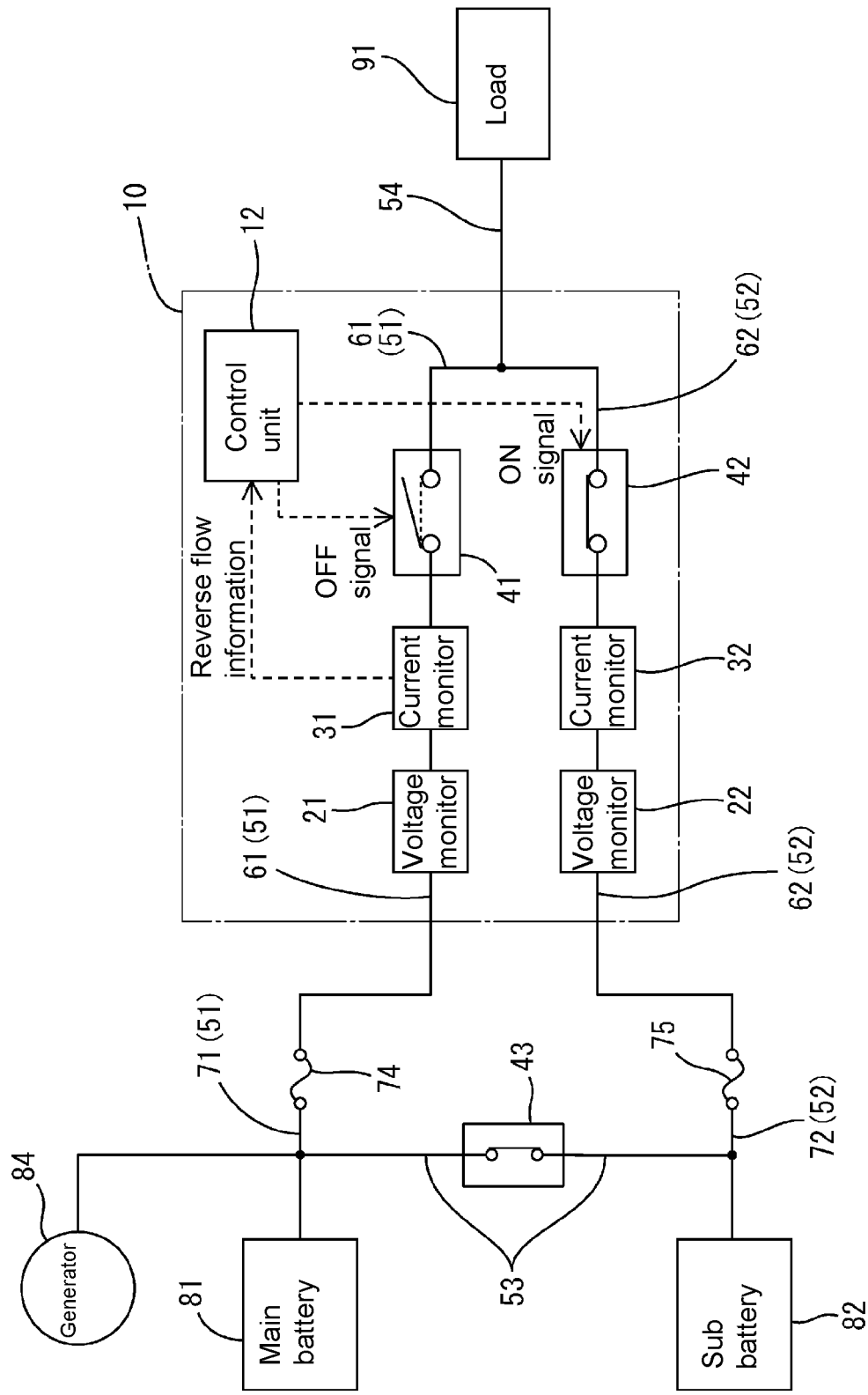
FIG. 3 is an illustrative diagram conceptually illustrating control in a case where current flows in a reverse direction in one of paths in the relay device shown in FIG. 2.

When executing the determination process of step S4 in FIG. 6, if the control unit 12 determines that the relay unit, which is provided in the path that is not the reverse flow path (the other path that is different from the path that is determined that the current flows in the reverse direction in step S2), is in the ON state (in case of "Yes" in S4), the control unit 12 executes the process of step S5, and then switches the relay unit provided in the reverse flow path (the path that is determined that the current flows in the reverse direction in step S2) to the OFF state. If it is determined that, for example, the current flowing through the first conduction path 51 flows in the reverse direction, when the control unit 12 confirms that the second relay unit 42 is in the ON state in step S4, the control unit 12 provides a control signal that causes the first relay unit 41 to be switched to the OFF state as shown in FIG. 3 in the process of step S5, and switches the first relay unit 41 provided in the first conduction path 51 to the OFF state.

In this manner, the control unit 12 is one example of the switching control unit in this configuration, if both of the currents flowing through the first conduction path 51 and the second conduction path 52 flow in the normal direction (direction toward the load 91), the first relay unit 41 and the second relay unit 42 are kept in the ON state, whereas if the current flows in the reverse direction to the normal direction in one of the first conduction path 51 and the second conduction path 52, one of the first relay unit 41 and the second relay unit 42, which is provided in the reverse flow path, is switched to the OFF state. Specifically, if the current flows in the reverse direction in one of the first conduction path 51 and the second conduction path 52, the control unit 12 switches the one of the first relay unit 41 and the second relay unit 42 (the relay unit provided in the reverse flow path) to the OFF state after confirming that the other relay unit (the relay unit provided in the path that is not the reverse flow path) is in the ON state in steps S3 and S4.

Figure 4:
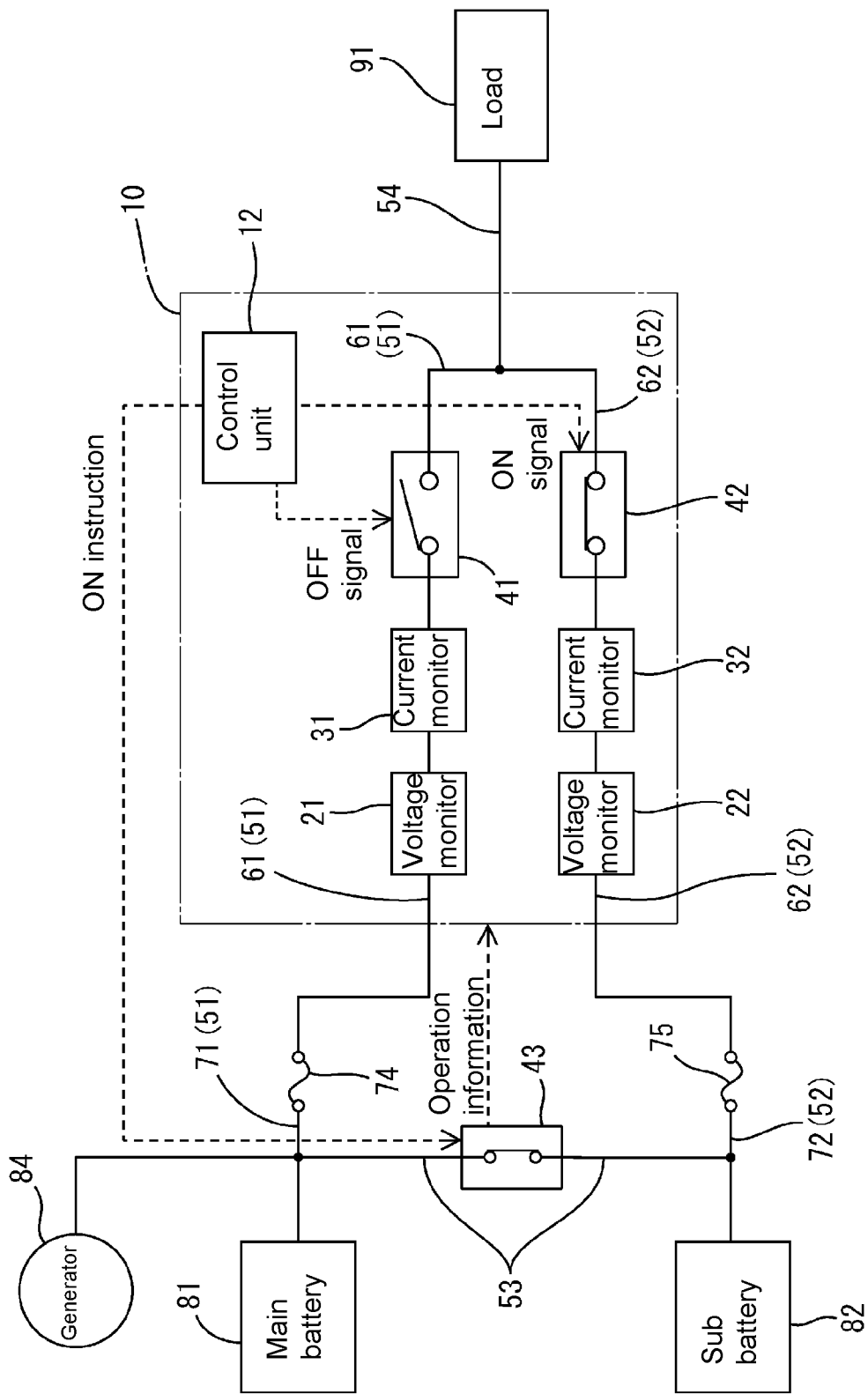
FIG. 4 is an illustrative diagram conceptionally illustrating operation for switching a third relay to an ON state after switching a relay unit in one of the paths to an OFF state in the relay device shown in FIG. 2.

After executing the process of step S5 in FIG. 6, the control unit 12 executes the process of step S6 and determines whether the third relay unit 43 (separation relay) can be controlled. Specifically, the control unit 12 outputs, directly or indirectly via another device, an ON signal instructing the third relay unit 43 to be ON as shown in FIG. 4 and confirms whether the third relay unit 43 is switched to be ON in response to the ON signal. Confirmation whether the third relay unit 43 is switched to be ON may be made based on whether or not a signal from the third relay unit 43 (a signal specifying that it is switched to be ON) can be acquired, or may be made by detecting the potential difference across the third relay unit 43 and determining whether the potential difference is below a constant value. When the ON signal is sent from the control unit 12 to the third relay unit 43, if it is confirmed that the third relay unit 43 is switched to be ON in response to the ON signal as described above, the control unit 12 executes the process of step S8 and switches all of the first relay unit 41, the second relay unit 42, and the third relay unit 43 to be ON.

In this configuration, the control unit 12 is one example of the confirmation unit and functions to confirm whether the third relay unit 43 can be controlled to be in the ON state if reverse flow of current occurs in one of the first conduction path 51 and the second conduction path 52 (specifically, the third relay unit 43 can be controlled to be ON in response to the ON signal).

Figure 5:
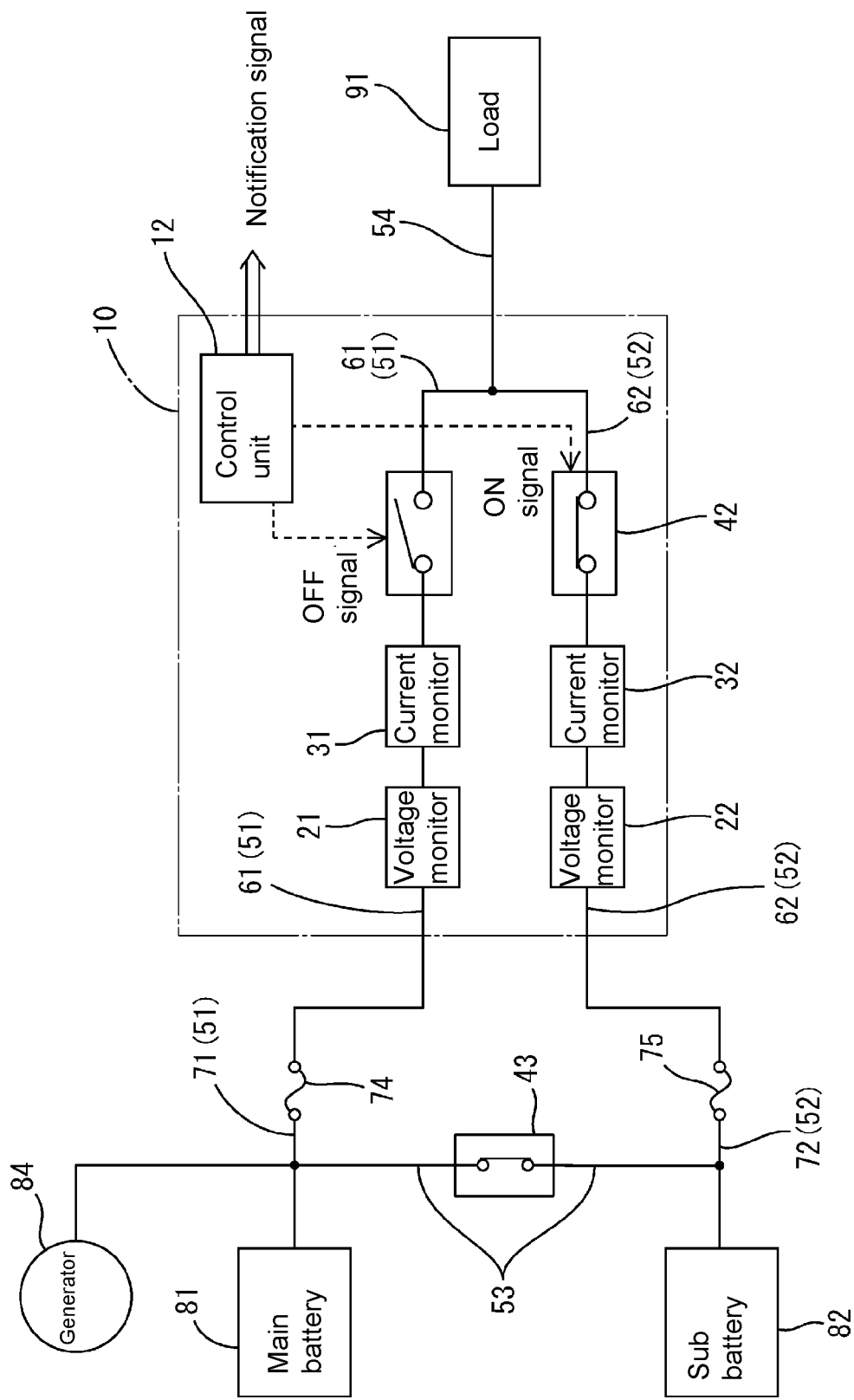
FIG. 5 is an illustrative diagram conceptionally illustrating notification operation of the relay device shown in FIG. 2.

If the control unit 12 determines that control of the third relay unit 43 (OFF operation) cannot be performed in step S6 (in case where, when the control unit 12 sends the ON signal to the third relay unit 43, but the third relay unit 43 is not switched to be ON in response to the ON signal), the control unit 12 executes the process of step S7, and gives a notification to the outside (specifically, a warning indicating a malfunction in the third relay unit 43 or the like). If it is determined that, for example, the current flowing through the first conduction path 51 flows in the reverse direction in step S2 and the first relay unit 41 is switched to the OFF state as shown in FIG. 3 by the process of the step S5, the control unit 12 outputs a notification signal to the outside as shown in FIG. 5 in the process of step S7 if it is determined that the control of the third relay unit 43 (OFF operation) cannot be performed in step S6. This notification signal may be, for example, a notification signal for displaying a warning mark or message in a lamp or an indicator mounted in the vehicle, or may be a notification signal for generating a predetermined warning message or sound from a buzzer or speaker. Or, it may be a notification signal for communicating occurrence of a specific abnormality to an external device (an electronic device in the vehicle or a device outside of a vehicle) using wired or wireless communication or the like. With such a notification signal, the occurrence of an abnormality can be communicated to a user, a person in charge of maintenance, or an external device.

The control unit 12 is one example of a notification unit in this configuration, and functions to perform notification if the confirmation unit has confirmed that the third relay unit 43 cannot be controlled to be in the ON state.

As described above, the relay device 10 in this configuration keeps the first relay unit 41 and the second relay unit 42 in the ON state if the current flows through each of the first conduction path 51 and the second conduction path 52 in the normal direction toward the load 91. With this configuration, if the current flows through each of the first conduction path 51 and the second conduction path 52 in the normal direction, it is possible to supply the current through the two paths. In addition to enabling current supply through the two paths, if the current flows in the reverse direction in one of the paths, it is also possible to switch the first relay unit 41 and the second relay unit 42 that is provided in the reverse flow path, to the OFF state. In this manner, because the relay unit that is provided in the path in which reverse flow of current occurs can be switched to the OFF state, it is possible to prevent reverse flow from continuing in the path. Therefore, malfunction due to occurrence of reverse flow of current, such as a break of the fuse portion provided in the reverse flow path caused by continuous increase of the reverse current, can be prevented.

If the current flows in the reverse direction in one of the first conduction path 51 and the second conduction path 52, the control unit 12, which corresponds to the switching control unit, switches one of the first relay unit 41 and the second relay unit 42 to the OFF state after confirming that the other relay unit is in the ON state. If the current flows in the reverse direction in one of the paths, the relay device 10 configured in this manner can switch the relay unit provided in the one path through which the current flows in the reverse direction (one relay unit) to the OFF state after securely switching the other relay unit to the ON state.

Accordingly, power supply to the load 91 is reliably prevented from being lost before and after the one relay unit is switched to the OFF state.

The relay device 10 has the confirmation unit that confirms whether the third relay unit 43 can be controlled to be in the ON state if reverse current occurs in one of the first conduction path 51 and the second conduction path 52. The relay device 10 configured in this manner can confirm whether the third relay unit 43 can be controlled to be in the ON state if reverse flow occurs in one of the conduction paths, and can clarify a cause of the reverse flow more clearly by ascertaining whether the third relay unit 43, which may be a cause of the reverse current, can be normally controlled.

The relay device 10 has the notification unit that performs notification in a case where the confirmation unit confirmed that the third relay unit 43 cannot be controlled to be in the ON state. The relay device 10 configured in this manner can confirm, if reverse flow occurs, whether the third relay unit 43 can be normally controlled, and if confirming that the third relay unit 43 cannot be controlled to be in the ON state (that is, if the possibility that the third relay unit 43 is the cause of the reverse flow increases), the relay device 10 can notify the outside about this.

Embodiment 2

Next, Embodiment 2 will be described with reference to FIG. 7 and so on. In Embodiment 1, an example was described in which the entire relay device 10 is configured as an integrated unit device. In contrast, a relay device relay device 210 of Embodiment 2 shown in FIG. 7 differs from the relay device 10 of Embodiment 1 only in that it is configured with a plurality of unit devices, a control unit is provided in each of the unit devices, and a communication line 214 connecting among the unit devices is provided. Accordingly, in the relay device 210 of Embodiment 2, structures that are the same as those of the relay device 10 of Embodiment 1 are given the same reference numerals of each portion of the relay device 10, and their detailed descriptions are omitted.

Figure 7:
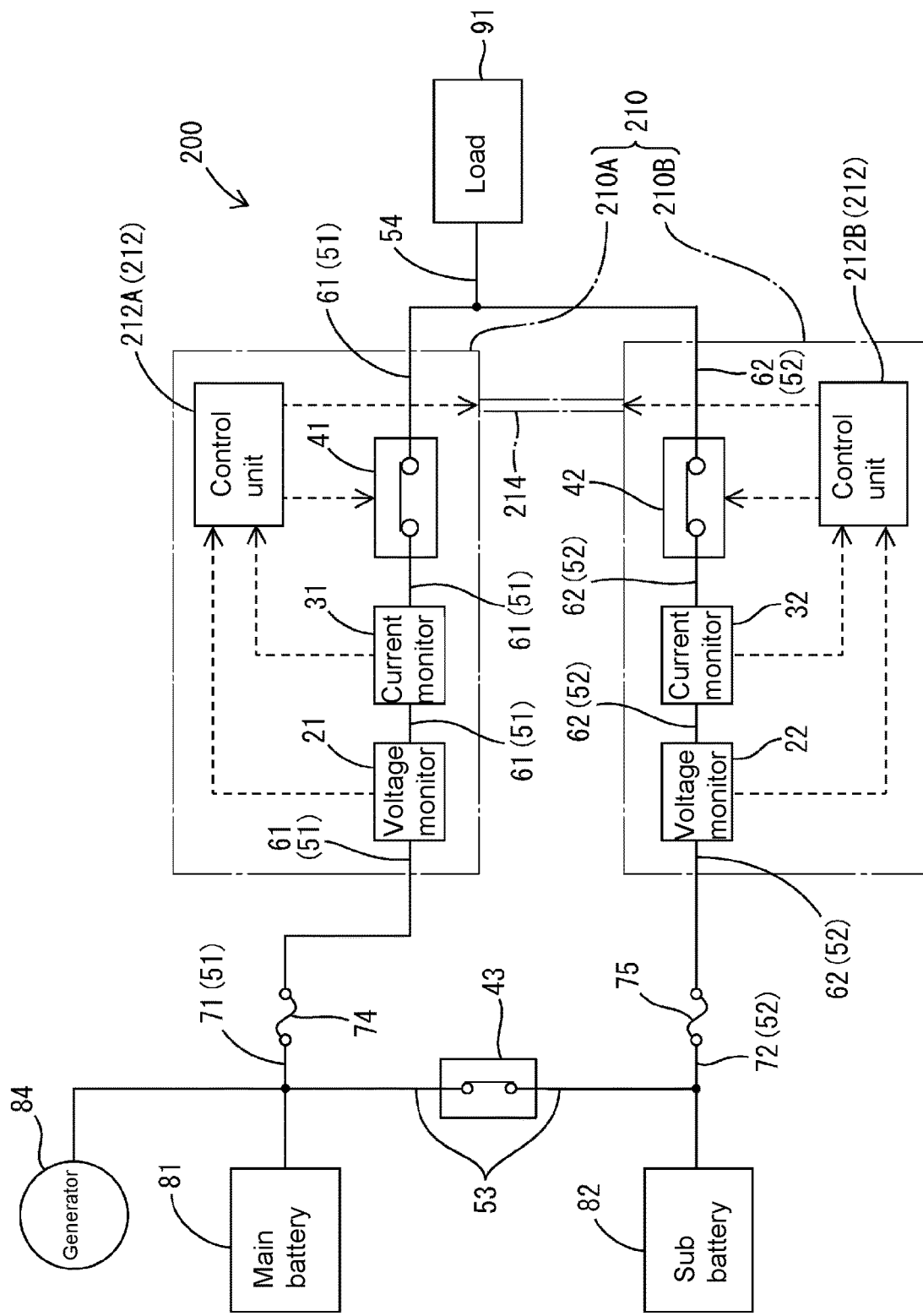
FIG. 7 is a block diagram schematically illustrating an example of a relay device and its surroundings according to Embodiment 2.

In the example shown in FIG. 7, the first relay unit 41, the first voltage detection unit 21, the first current detection unit 31, a control unit 212A and so on are mounted, for example, on the same board, constituting a unit device 210A in which these elements are integrated as a unit. Also, the second relay unit 42, the second voltage detection unit 22, the second current detection unit 32, a control unit 212B and so on are mounted, for example, on the same board, constituting a unit device 210B in which these elements are integrated as a unit. The unit devices 210A and 210B constitute the relay device 210. Note that, in an in-vehicle power supply system 200 (hereinafter, also referred to as "system 200") as shown in FIG. 7, the portions other than the relay device 210 have the same configuration as in the in-vehicle power supply system 100 shown in FIGS. 1, 2 and so on. Also, each of the control units 212A and 212B has the same configuration as the control unit 12 (shown in FIG. 2 and so on).

In the example shown in FIG. 7, each of the control units 212A and 212B may perform the same control shown in FIG. 6 in response to establishment of a predetermined start condition. When each of the control units 212A and 212B performs the switching control shown in FIG. 6, it may switch ON the relay unit of the unit device 210A or 210B, in which it is provided, in step S1. In step S2, the control unit may determine whether the current flowing through the conduction path in which the relay unit is provided flows in the reverse direction. Then, in step S2, if the control unit determines that the current flowing through the conduction path in which the relay is provided flows in the reverse direction, the control unit may perform information communication via the communication line 214, and may confirm the ON or OFF state of the other relay unit in step S3 (the other relay unit provided in the other unit device that is not the unit device in which the process of step S3 is being executed). If the other relay unit is in the ON state, the control unit may execute the process of step S5, and may switch the relay unit for which it is determined that reverse flow occurs in step S2 to the OFF state. Steps S7 and S8 are the same as those of Embodiment 1, and thus the control units 212A and 212B may execute these processes in cooperation with each other.

Embodiment 3

Figure 8:
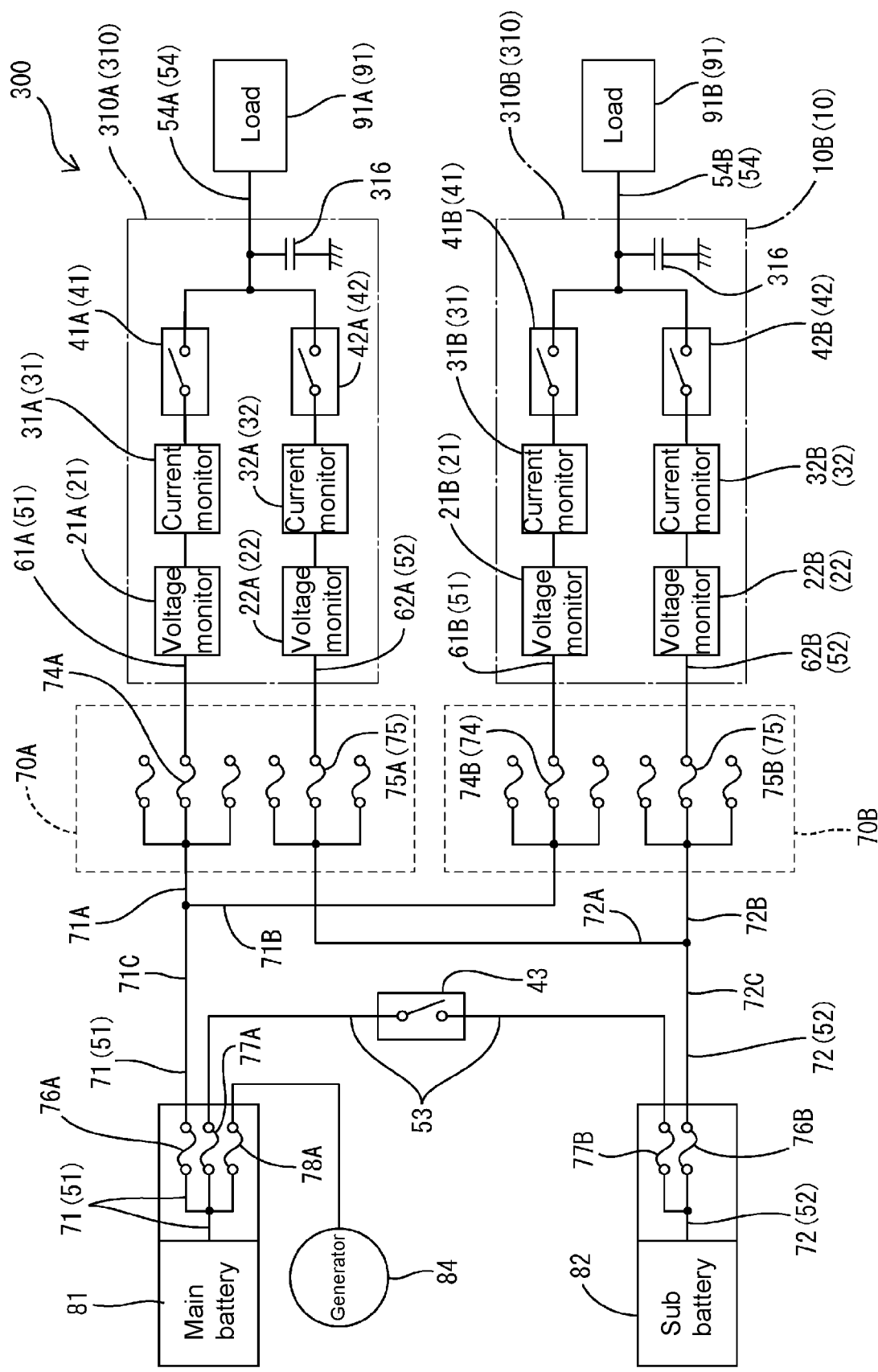
FIG. 8 is a block diagram schematically illustrating an example of an in-vehicle power supply system including a relay device according to Embodiment 3.
Figure 9:
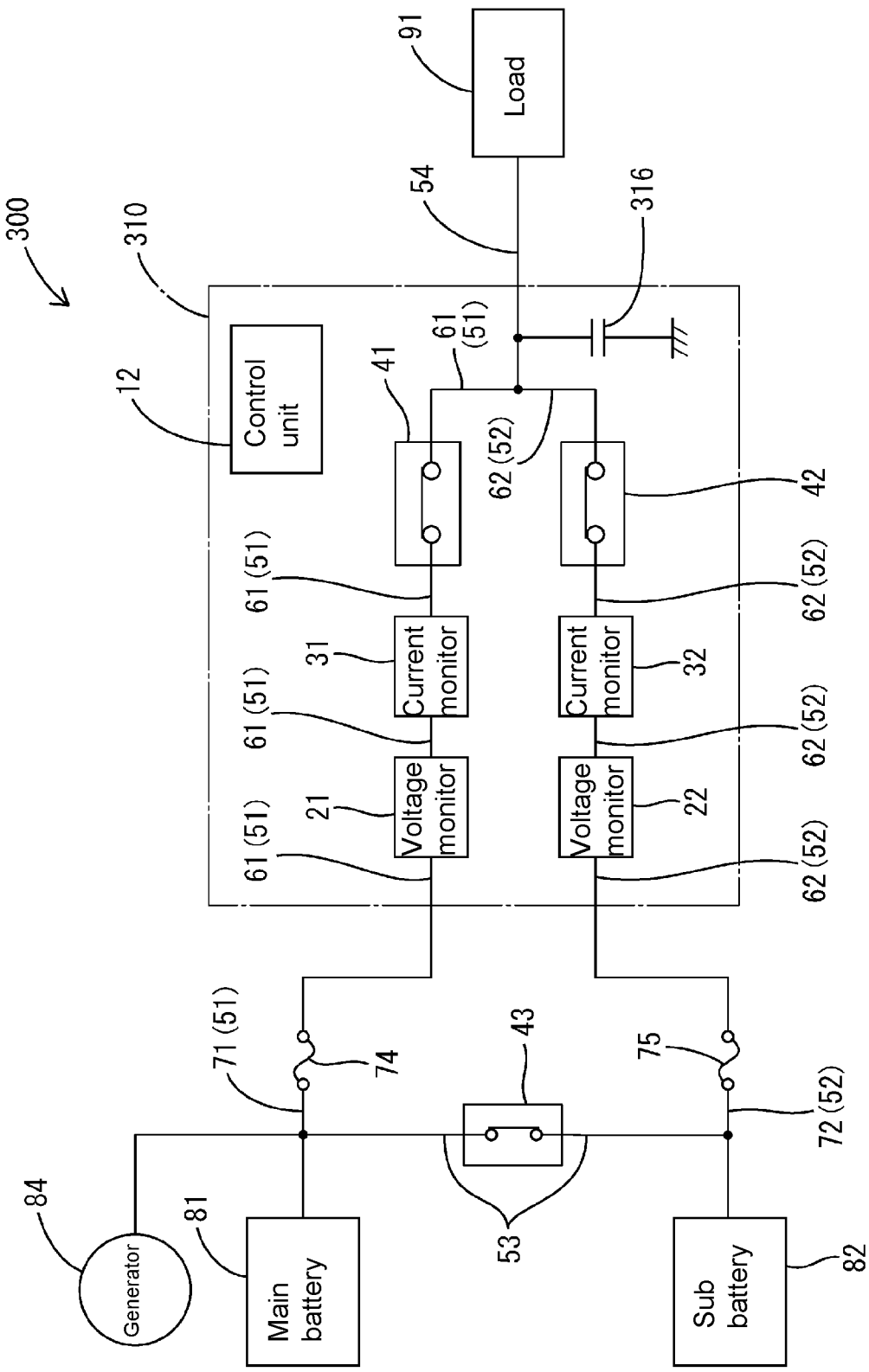
FIG. 9 is a block diagram schematically illustrating an example of the relay device and its surroundings according to Embodiment 3.

Next, Embodiment 3 will be described with reference to FIG. 8 and so on. A relay device 310 of Embodiment 3 has a more specific configuration of the relay device 10 of Embodiment 1, includes all of the structures and functions of the aforementioned relay device 10 of Embodiment 1, and has a configuration in which further structures and functions are added. Accordingly, the same portions of Embodiment 1 in FIGS. 8 and 9 are given the same reference numerals in FIGS. 1 and 2, and their detailed description is omitted. Specifically, the in-vehicle power supply system 300 shown in FIG. 8 differs from the in-vehicle power supply system 100 shown in FIG. 1 only in that a third power storage unit 316 is added. The relay device 310 of Embodiment 3 shown in FIG. 9 and so on differs from the relay device 10 of Embodiment 1 shown in FIG. 2 and so on in that the third power storage unit 316 is added, and other portions are the same as those of the relay device 10 of Embodiment 1.

Note that a relay device 310B shown in FIG. 8 has the same configuration and functions as those of the relay device 310A. As a representative example, in the following description, it is assumed that the relay device 310A shown in FIG. 8 has a configuration as shown in FIG. 9.

The relay device 310 shown in FIG. 9 includes the third power storage unit 316. This third power storage unit 316 is configured as a capacitor, and may be electrically connected to at least one of a portion on the load 91 side relative to the first relay unit 41 in the path between the first power storage unit 81 and the load 91 (a portion on a downstream side relative to the first relay unit 41) and a portion on the load 91 side relative to the second relay unit 42 in the path between the second power storage unit 82 and the load 91 (a portion on a downstream side relative to the second relay unit 42). In the example shown in FIG. 9, the third power storage unit 316 is electrically connected to a conduction path 54 that is a shared path connecting both of the first conduction path 51 and the second conduction path 52 and the load 91. Specifically, one electrode of the third power storage unit 316, which is configured as a capacitor, is connected to the conduction path 54, and the other electrode is connected to ground. This third power storage unit 316 has a configuration in which it is charged by at least one of the first power storage unit 81 and the second power storage unit 82 when at least one of the first relay unit 41 and the second relay unit 42 is in the ON state. Then, even when both of the first relay unit 41 and the second relay unit 42 are switched to the OFF state, the third power storage unit 316 is kept conductively connected with the load 91, and thus it can supply power to the load 91.

The relay device 310 configured in this manner can supply power to the load 91 using the third power storage unit 316 even when both of the relay units are switched to the OFF state for some reason, and thus power supply to the load 91 is even less likely to be cut off. When a path of one relay unit is inspected, for example, by switching the one relay unit to the OFF state, even if the other relay unit is in the OFF state for some reason, power supply to the load 91 is likely to be continued with power supplied from the third power storage unit 316.

The relay device 310 shown in FIG. 9 can perform switching control (shown in FIG. 6) in the same manner as that in Embodiment 1.

Figure 10:
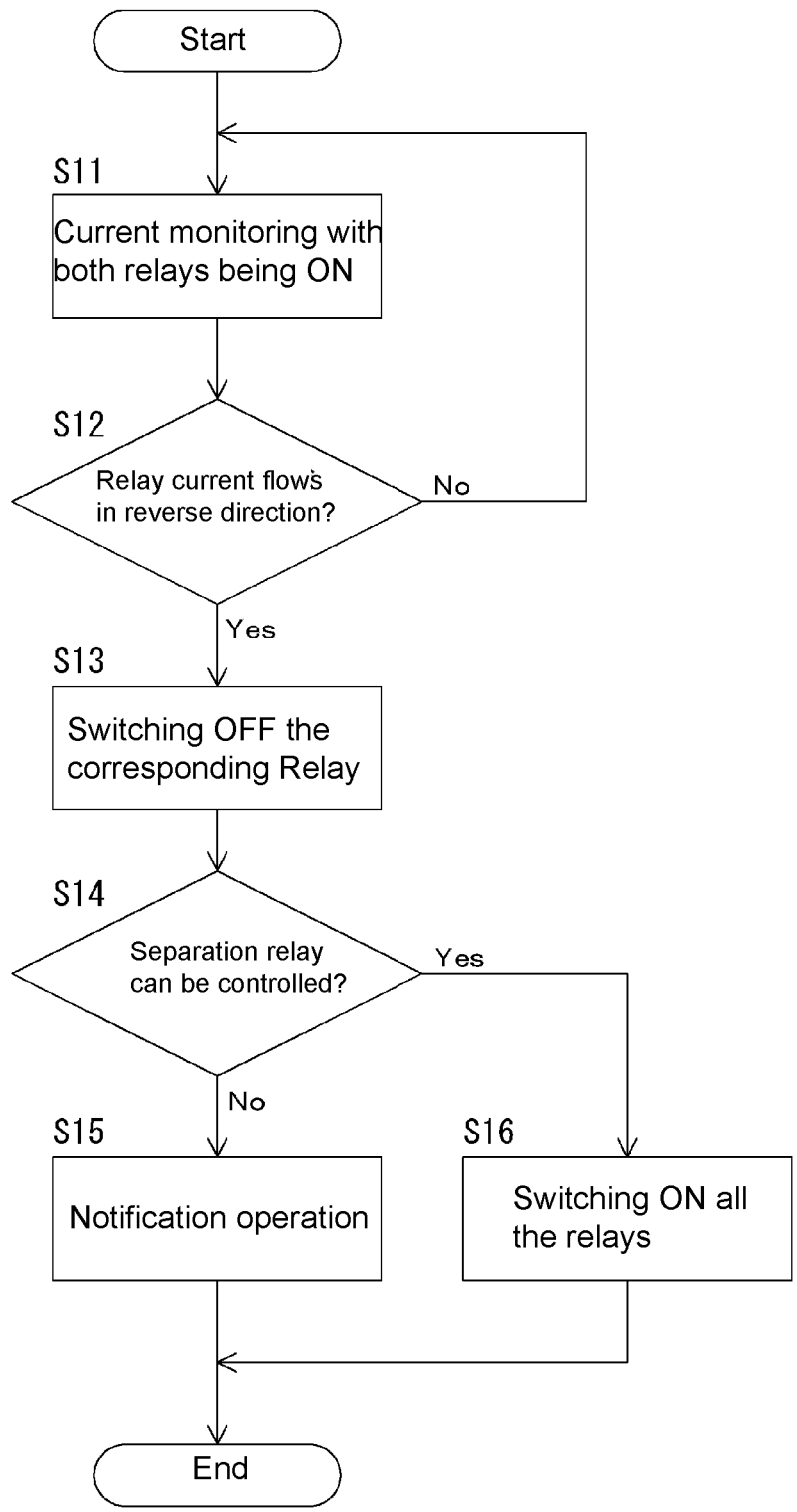
FIG. 10 is a flowchart illustrating another example of control performed by the relay device according to Embodiment 3.

To shorten the processing time period, the relay device 310 shown in FIG. 9 may perform, instead of the switching control shown in FIG. 6, switching control with a flow as shown in FIG. 10 in which the confirmation process of step S3 and the determination process of step S4 in FIG. 6 are omitted. Note that the processes of steps S11, S12, S13, S14, S15, and S16 of the switching control in FIG. 10 are respectively the same as those of steps S1, S2, S5, S6, S7, and S8 in FIG. 6.

Figure 11:
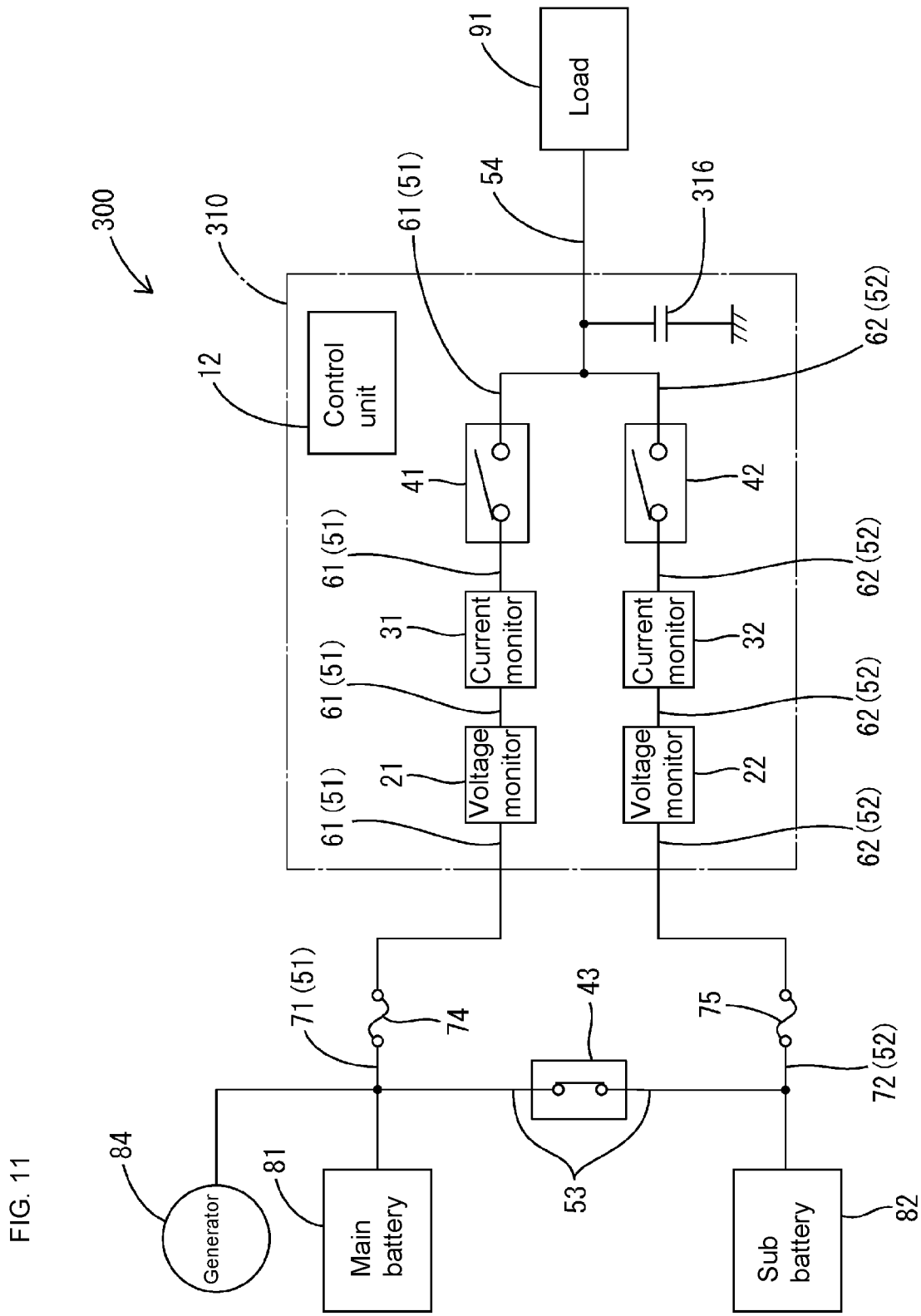
FIG. 11 is an illustrative diagram conceptually illustrating a case where both relay units are switched to an OFF state in the relay device according to Embodiment 3.

When the switching control is performed with the flow as shown in FIG. 10, because the processes of steps S3 and S4 shown in FIG. 6 are omitted, when one relay unit that is provided in one of the paths is switched to the OFF state in step S13 in accordance with occurrence of reverse flow in the one path, there is a possibility that the other relay unit may be switched OFF around the same time. That is, both of the first relay unit 41 and the second relay unit 42 are switched to the OFF state as shown in FIG. 11, and thus there is a possibility that a time period for which no power is supplied to the load 91 from any of the first power storage unit 81, the second power storage unit 82, and the generator 84 occurs. However, even if both of the relay units are switched to the OFF state, power supply from the third power storage unit 316 to the load 91 is continued for a certain time period, and thus the power supply to the load 91 is not easily interrupted.

Embodiment 4

Figure 12:
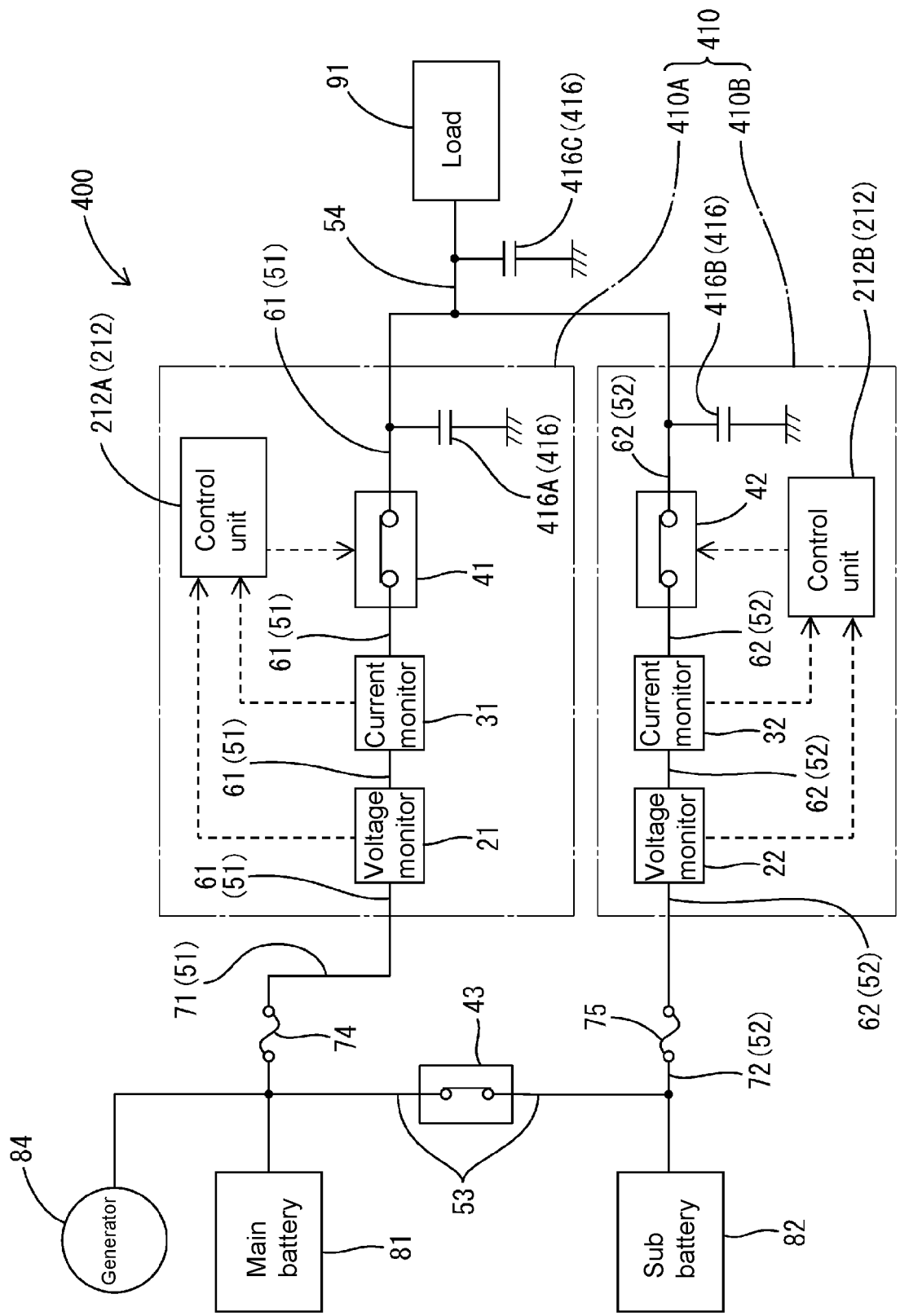
FIG. 12 is a block diagram schematically illustrating an example of a relay device and its surroundings according to Embodiment 4.
Figure 13:
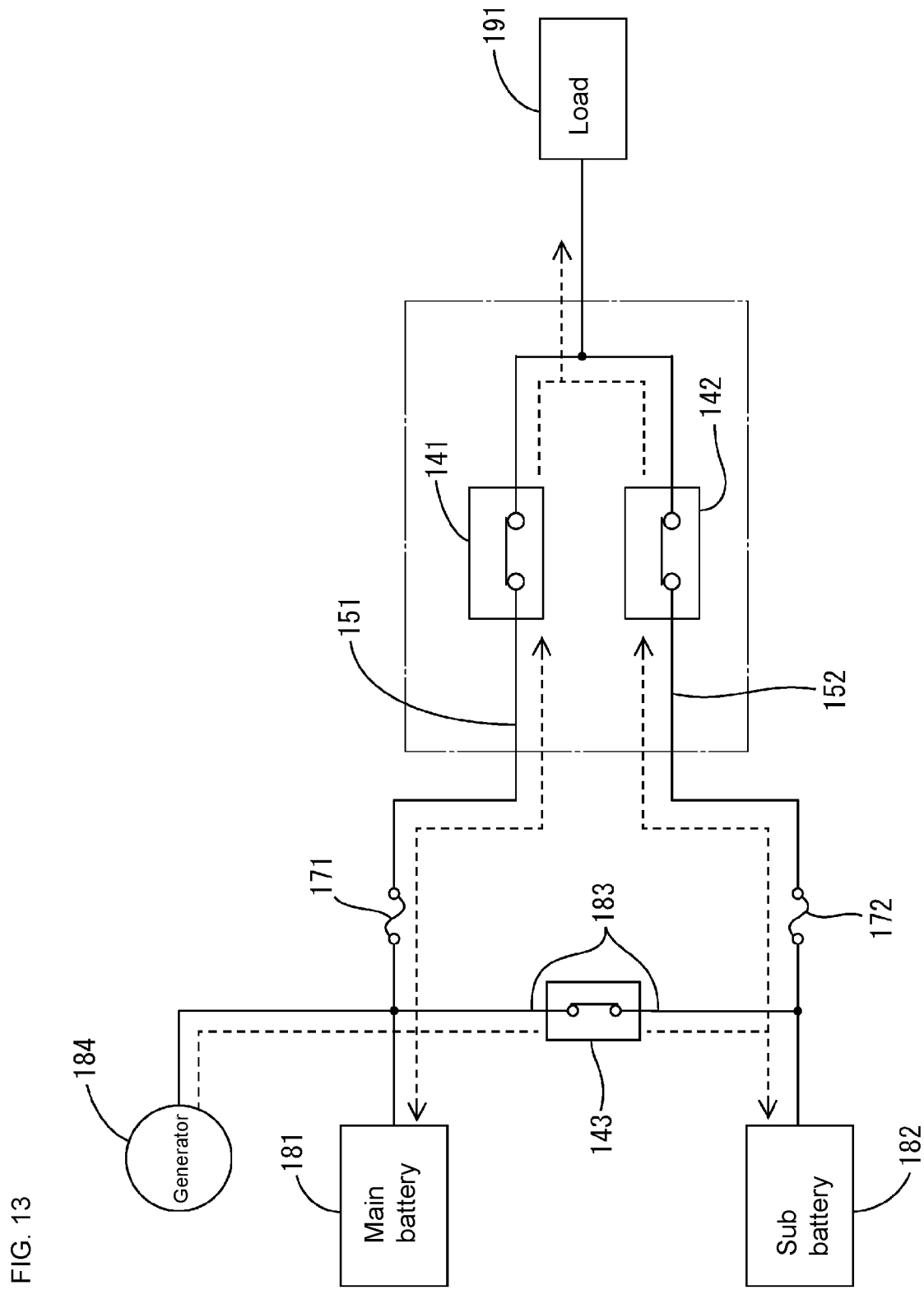
FIG. 13 is an illustrative diagram conceptually illustrating charging operation and power supply operation performed in a system including a relay device according to a comparative example.
Figure 14:
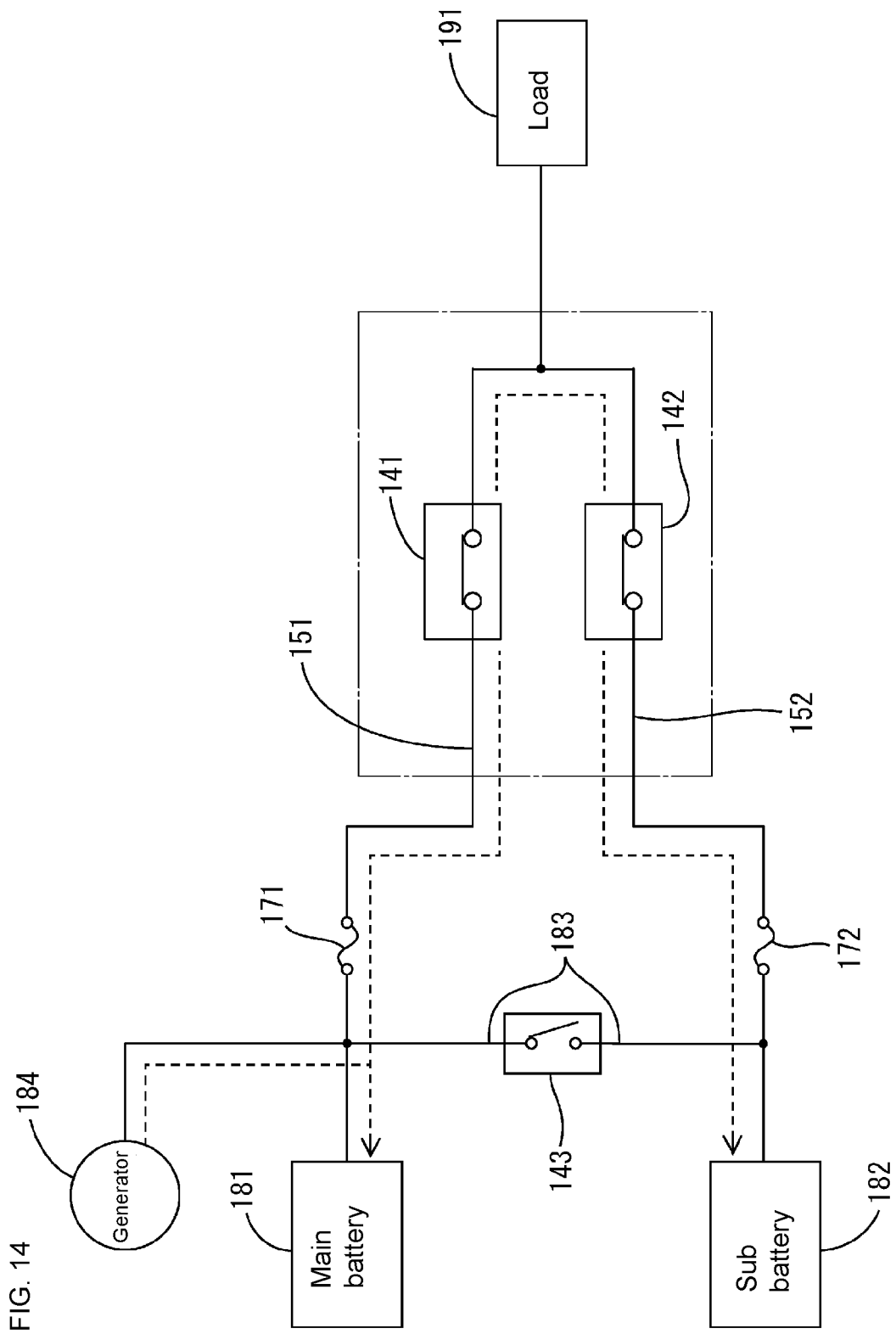
FIG. 14 is an illustrative diagram conceptually illustrating sneak current occurred in the system including the relay device according to the comparative example.

Next, Embodiment 4 will be described with reference to FIG. 12. A relay device 410 of Embodiment 4 has a more specific configuration of the relay device 210 of Embodiment 2, includes all of the structures and functions of the aforementioned relay device 210 of Embodiment 2, and has a configuration in which further structures and functions are added. Accordingly, the same portions as in Embodiment 2 in FIG. 12 are given the same reference numerals in FIG. 7, and their detailed description is omitted. Specifically, the in-vehicle power supply system 400 shown in FIG. 12 differs from the in-vehicle power supply system 200 shown in FIG. 7 in that a third power storage unit 416 is added. A relay device 410 of Embodiment 4 shown in FIG. 12 differs from the relay device 210 of Embodiment 2 shown in FIG. 7 in that the third power storage unit 416 is added, and other portions are the same as those of the relay device 210 of Embodiment 2. A unit device 410A differs from the unit device 210A shown in FIG. 7 only in that a third power storage unit 416A is added, and a unit device 410B differs from the unit device 210B shown in FIG. 7 only in that a third power storage unit 416B is added.

The relay device 410 shown in FIG. 12 includes three third power storage units 416. These three third power storage units 416 are configured as capacitors, and include a third power storage unit 416A that is connected to a portion on the load 91 side relative to the first relay unit 41 in the first conduction path 51 (a portion on a downstream side relative to the first relay unit 41), a third power storage unit 416B that is connected to a portion on the load 91 side relative to the second relay unit 42 in the second conduction path 52 (a portion on a downstream side relative to the second relay unit 42), and a third power storage unit 416C that is connected to a conduction path 54, which is a shared path. Each of these third power storage units 416 has a configuration in which it is charged by at least one of the first power storage unit 81 and the second power storage unit 82 when at least either of the first relay unit 41 or the second relay unit 42 is in the ON state. Then, even when one of the first relay unit 41 and the second relay unit 42 is switched to the OFF state, these third power storage units 316 are kept conductively connected with the load 91, and thus they can supply power to the load 91. The relay device 410 configured in this manner can generate the same effects as those in Embodiments 2 and 3.

The relay device 410 shown in FIG. 12 can perform switching control in the same manner as that in Embodiment 2. When performing the switching control, the relay device 410 may perform the switching control in the same exact manner as that in Embodiment 2, but the process for confirming the ON or OFF state, when reverse flow of current occurs in any of the paths, of the relay unit provided in other paths may be omitted to shorten the processing time period. In this case, the communication line 214 shown in FIG. 7 can be omitted.

Also in this relay device 410, both of the first relay unit 41 and the second relay unit 42 are switched to the OFF state, and if no power is supplied to the load 91 from any of the first power storage unit 81, the second power storage unit 82, and the generator 84, power supply from the third power storage units 416 to the load 91 is continued, and thus the power supply to the load 91 is not easily interrupted.

OTHER EMBODIMENTS

The present description is not limited to the embodiments described above using the foregoing description and drawings, and embodiments such as the following are also encompassed in the technical scope of the present description.

(1) In the above-described embodiments, examples in which the first and second current detection units are provided on an upstream side relative to the relay units are shown, but these current detection units may also be provided on a downstream side relative to the relay units.

(2) The first relay unit 41, the second relay unit 42, and the third relay unit 43 used in the above-described embodiments may have a configuration in which they can cut off conduction in the conduction path in both directions, and thus well-known various relays can be employed for them. They may be a semiconductor relay device or a mechanical relay device.

(3) In the above-described embodiments, an example in which one load is connected on a downstream side relative to each of the relay devices is shown, but it is also possible to connect a plurality of loads.

(4) In the above-described embodiments, a fuse that fuses when overcurrent occurs is given as an example of the fuse portion 74 (first fuse portion) and the fuse portion 75 (the second fuse portion), but various well-known fuse structures that can cut off the conduction path when overcurrent occurs may be employed. The fuse portions 74 and 75 may be, for example, a well-known semiconductor fuse device.

LIST OF REFERENCE NUMERALS

10, 210, 310, 410 Relay device
12, 212A, 212B Control unit (switching control unit, notification unit)
31 First current detection unit
32 Second current detection unit
41 First relay unit
42 Second relay unit
43 Third relay unit
51 First conduction path
52 Second conduction path
53 Third conduction path
74 Fuse portion (first fuse portion)
75 Fuse portion (second fuse portion)
81 First power storage unit
82 Second power storage unit
91 Load
316, 416 Third power storage unit

The invention claimed is:

1. A relay device that is used in an in-vehicle power supply system including a first conduction path that is electrically connected to a first power storage unit and is a path for supplying power to a load via a first fuse portion, a second conduction path that is electrically connected to a second power storage unit and is a path for supplying power to the load via a second fuse portion, and a third conduction path whose one side is connected to the first conduction path on a first power storage unit side relative to the first fuse portion and the other side is connected to the second conduction path on a second power storage unit side relative to the second fuse portion, the relay device comprising:
 a first relay unit configured to be switched between ON and OFF states at a position on a load side relative to the first fuse portion in the first conduction path;
 a second relay unit configured to be switched between ON and OFF states at a position on the load side relative to the second fuse portion in the second conduction path;
 a first current detection unit configured to detect, at least, a direction of current flowing through the first conduction path;
 a second current detection unit configured to detect, at least, a direction of current flowing through the second conduction path; and
 a switching control unit configured to maintain the ON state of the first relay unit and the second relay unit if a current flows in a normal direction, which is a direction toward the load, in each of the first conduction path and the second conduction path, and configured to switch, if the current flows in a reverse direction to the normal direction in one of the first conduction path and the second conduction path, that one of the first relay unit and the second relay unit that is provided in a reverse flow path in which the current flows in the reverse direction, to the OFF state.

2. The relay device according to claim 1, wherein the switching control unit is configured to switch, if the current flows in the reverse direction in one of the first conduction path and the second conduction path, the one of the first relay unit and the second relay unit to the OFF state after confirming that the other relay unit is in the ON state.

3. The relay device according to claim 1, further comprising: a confirmation unit that is configured to confirm whether a third relay unit, which switches the third conduction path between a conductive state and a non-conductive state if reverse flow of current occurs in one of the first conduction path and the second conduction path, can be controlled to be in an ON state.

4. The relay device according to claim 3, further comprising: a notification unit that is configured to give a notification if the confirmation unit has confirmed that the third relay unit cannot be controlled to be in the ON state.

5. The relay device according to claim 1, further comprising:
 a third power storage unit that is electrically connected to at least one of a portion on the load side relative to the first relay unit in a path between the first power storage unit and the load and a portion on the load side relative to the second relay unit in a path between the second power storage unit and the load, and that is charged by at least one of the first power storage unit and the second power storage unit and kept in a state of being conductively connected with the load when the first relay unit and the second relay unit are in the OFF state.

* * * * *